INVENTORS:
RICHARD E. COSGROVE
IRWIN H. KRULL
CHARLES A. MASK

*Thomas L. Peterson*
BY          ATTORNEY

United States Patent Office 3,706,649
Patented Dec. 19, 1972

3,706,649
ELECTROCHEMICAL ELECTRODE
Richard E. Cosgrove, Los Angeles, and Irwin H. Krull and Charles A. Mask, Garden Grove, Calif., assignors to Beckman Instruments, Inc.
Filed June 29, 1970, Ser. No. 50,746
Int. Cl. G01n 27/46
U.S. Cl. 204—195 M
19 Claims

ABSTRACT OF THE DISCLOSURE

An electrochemical electrode for measuring the ion concentration or activity of solutions. The ion sensitive barrier of the electrode contains a macrocyclic compound, mineral oil, and a sufficient amount of a compound lipid to render the barrier substantially solid. Preferably, an aromatic component is included in the barrier to provide long term stability of the barrier. The macrocyclic compound is preferably valinomycin when the electrode is to be utilized for selectively measuring the potassium ion activity of solutions, and is preferably nonactin when the electrode is to be utilized for selectively measuring the ammonium ion activity of solutions.

BACKGROUND OF THE INVENTION

This invention relates generally to an electrochemical electrode for measuring the ion concentration or activity of a solution and, more particularly, to such an electrode employing a macrocyclic compound as the primary sensing medium in the ion sensitive barrier of the electrode.

Various methods and apparatus have been employed for the measurement of ion activity. While the invention is recognized as being potentially applicable to the measurement of other ion activities, it is known to be particularly useful for the measurement of potassium and ammonium ion activities.

It has long been recognized that potassium ions play a vital role in many physiological processes. For example, the resting electrical potential difference (resting potential) between the inside and outside of most excitable cells (e.g. nerve cells; skeletal, smooth, and cardiac muscle cells) is dependent on the facts that the potassium ion concentration is much higher in the intra-cellular than in the extra-cellular fluid and that the surface membrane of these cells when they are at rest is much more permeable to potassium than to other cations. Indeed, the magnitude of the resting potential in such cells has been shown to depend in large part on the ratio of intra-cellular to extra-cellular potassium ion concentration. Since excitability is, in turn, dependent on the magnitude of the resting potential, it is evident that small changes in the concentration of potassium ions in the extra-cellular fluid have profound effects on the activity of nerve and muscle cells. For example, an increase in the concentration of potassium ions in extra-cellular fluid (e.g. blood plasma) from the normal value of 4–5 mM. to 8–9 mM. can produce complete loss of excitability of cardiac muscle cells and thus cessation of the pumping action of the heart. For this and other important reasons knowledge of the concentration of potassium ions in blood plasma is of great importance to physicians in the management of many clinical disorders such as acute and chronic renal disease, endocrine diseases such as adrenal insufficiency and diabetes mellitus, disturbances of fluid balance produced by vomiting and diarrhea, circulatory shock, digitalis intoxication, etc. Therefore, the availability of a rapid, direct method for the measurement of potassium activity in biological fluids such as provided by this invention will be of great use not only in biological, physiological, biochemical, and pharmacological research, but also in clinical medicine.

Potassium ion concentrations in biological and other aqueous fluids have been measured previously by precipitation methods and by flame emission and atomic absorption photometry. These procedures require considerable sample preparation and manipulation and are therefore time consuming. Furthermore, they measure the amount of potassium ion present in the sample rather than the activity of the ion in the solution analyzed. Attempts to formulate glass electrodes which are selective for potassium ions have been carried out in a number of laboratories. If they were sufficiently selective, these electrodes would permit rapid, direct determination of potassium ion activity. However, it has proved impossible to make glass electrodes with a selectivity ratio for potassium to sodium of greater than about 10 to 1. Since the concentration of sodium ions in human blood plasma is 30 times greater than the concentration of potassium ions, these glass electrodes are not suitable for measuring potassium ion activity in such fluids.

Within the past few years, several laboratories have reported that certain macrocyclic compounds, e.g., valinomycin, enniatin B, nonactin, monactin, dinactin, confer marked selectivity for potassium over sodium on thin (ca. $10^{-6}$ cm.) lipid bilayer membranes prepared from pure lecithin, mixed brain lipids, and sheep red cell lipids. The electrical potential difference across such thin membranes responds instantaneously to changes in the ratio of potassium ion concentrations in the aqueous phases bathing the two sides of the membrane. Nevertheless such thin bilayer membranes are not suitable for the practical measurement of potassium ion activities because of their extreme mechanical fragility. However, these investigations made clear the remarkable selectivity for potassium over sodium (as great as 1000 to 1) which certain macrocyclic compounds produce in thin bilayers of phospholipid.

More recently, several potassium ion sensitive electrodes containing certain macrocyclic compounds have been described in the literature and have become commercially available. A potassium ion responsive electrode employing as its ion sensitive barrier a liquid organic sensing solution impregnated in a Millipore filter is described in an article by Pioda et al. entitled "Highly Selectively Potassium Ion Responsive Liquid-Membrane Electrode," Analytical Letters, vol. 2, pp. 665–674 [1969] and in British Pat. No. 1,177,690 to Simon. These publications describe the liquid organic sensing solutions as comprising either valinomycin, nonactin or monactin contained in diphenylether.

An article by Frant et al. entitled "Potassium Ion Specific Electrode With High Selectivity for Potassium Over Sodium," Science, vol. 167, pp. 987–8 [1970] make reference to a potassium ion measuring electrode having an ion sensitive barrier comprising nonactin in Nujol-octanol, and to a commercially available electrode having a liquid organic ion sensitive barrier comprising a mixture of valinomycin and an aromatic solvent. Examples of the solvents mentioned in the article are nitrobenzene and higher homologs, diphenylether, chlorobenzene and bromobenzene.

Another commercially available potassium ion electrode employs a sensing solution containing a major portion of a non-aqueous hydrophobic solvent, such as decane, and minor portions of valinomycin and phospholipid, lecithin. Such sensing solution is supported between a pair of cellophane membranes in a sample measuring cell in which the sample contacts the outside surface of one of the membranes and KCl solution in which a silver chloride electrode is immersed contacts the outside of the other membrane.

As can be seen from the above summary of recent organic potassium ion measuring electrodes, liquid organic sensing solutions are employed which are either supported by a filter paper or a cellophane membrane. One purpose of our invention is to provide a potassium ion measuring electrode which employs an essentially solid ion sensitive barrier containing a macrocyclic compound, which offers considerable ease of use over the liquid membrane electrodes, besides having excellent selectivity to the ion being measured.

It is known that the aforementioned prior art potassium ion measuring electrodes are somewhat sensitive to ammonium ions, which constitute an interferent in the measuring of potassium ions. Our invention further relates to an electrode employing an essentially solid ion sensitive barrier containing a macrocyclic compound which is selectively sensitive to ammonium ions in the presence of potassium ions. An ammonium ion sensing electrode is useful for water pollution studies and in the determination of urea in biological fluids where urease is added to the fluid to release ammonium ions, the activity of which is a measure of the urea content of the fluid.

SUMMARY OF THE INVENTION

The principal object of the present invention is to provide an improved ion measuring electrode employing an essentially solid ion sensitive barrier containing a macrocyclic compound.

Another object of the invention is to provide ion measuring electrodes which are selectively sensitive to potassium and ammonium ions, respectively.

The terms "liquid," "solid," and "immiscible," and the like, which are used herein with reference to physical properties and materials are to be understood as referring to such properties as they exist under substantially normal conditions, such as room temperatures and atmospheric pressures. For example, the term "solid" refers to a stage wherein, under the above-mentioned normal conditions, the elements of a matrix or lattice structure exhibit spatial orientation which is substantially static or fixed over ordinary time periods during which the property of solidity is significant or required.

According to the principal aspect of the present invention, an electrochemical electrode is provided for measuring the ion activity of solutions in which the ion sensitive barrier of the electrode contains a macrocyclic compound, mineral oil, and a sufficient amount of a compound lipid to render the barrier substantially solid. Preferably, the barrier also contains an aromatic component. The barrier is a mixture of such constituents, and is substantially immiscible with aqueous solutions. Since the barrier is solid, the electrode may be constructed as a stand-up or dip type electrode in which the barrier closes the end of a nonconductive tube containing an internal filling solution in which a reference half cell is immersed, as well known in the art. In addition, because the barrier is solid, it will not flow out and contaminate the sample solution as do the liquid membranes employed in the aforementioned prior art electrodes.

Other objects, aspects and advantages of the invention will become apparent from the following description taken in connection with the accompanying drawing.

BRIEF DESCRIPTION OF THE DRAWING

FIG. 3 is a graph showing data for actual millivolt response of a typical potassium ion measuring electrode constructed in accordance wtih the present invention tested in five aqueous solutions ranging from $10^{-5}$ M to 1 M potassium ion activity; and FIG. 4 is a graph showing the response of the aforementioned potassium electrode in solutions of $10^{-5}$, $10^{-3}$ and $10^{-1}$ M KCl over a range of pH between 2 and 12.

DESCRIPTION OF THE PREFERRED EMBODIMENTS

Figure 1:
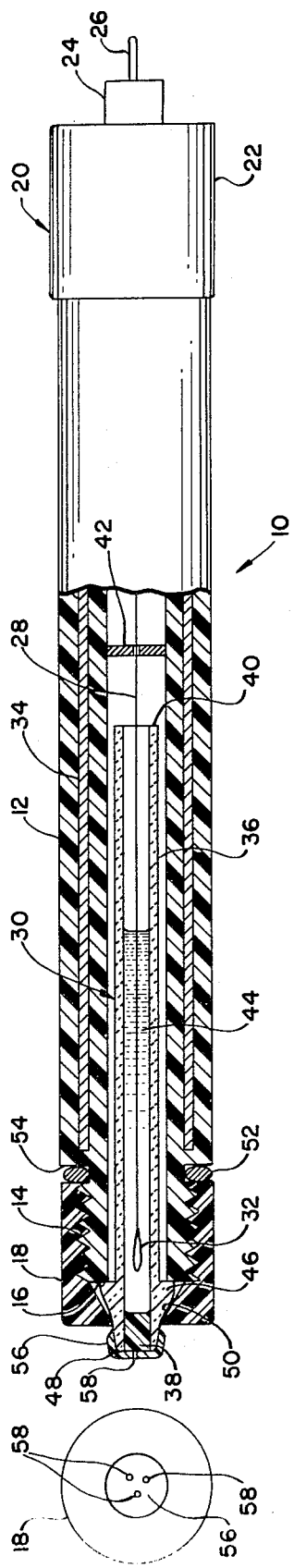
FIG. 1 is a partial longitudinal sectional view of an ion measuring electrode embodying the novel ion sensitive barrier of the present invention.

In accordance with the present invention, a substantially solid ion sensitive barrier which is immiscible with aqueous solutions is provided for an electrochemical ion measuring electrode. The barrier contains a mixture of a macrocyclic compound, mineral oil and a compound lipid. Preferably, the barrier also contains an aromatic component, although it is not required.

The macrocyclic compound is the primary sensing constituent of the barrier. It is believed that the oil enhances the mobility of the ion when paired with the macrocyclic compound, while the aromatic component provides long term stability of the barrier. The compound lipid serves as a solidification agent.

Desirable macrocyclic compounds include the monactin series, which includes nonactin, monactin, dinactin, and trinactin, valinomycin, and analogs having its ion selective character, and enniatin B. It has also been found that at least some macrocyclic polyether compounds will produce the results desired. In particular, a macrocyclic polyether synthesized by C. J. Pedersen of the Elastomer Branch of E. I. du Pont de Nemours and Company, Inc. has been successfully employed and it can be observed that the selected polyether (hereafter referred to as XXX–I) operates as an ion selective medium by exhibiting the capability of forming complexes with the potassium ions. The particular composition has been designated XXX–I and has been identified as containing 18 ring atoms and 6 ring oxygens. Pedersen refers to this class of compounds as crown compounds and in his nomenclature this composition is dicyclohexyl-18-crown-6. Reference may be made to the following literature reference for further identification: "Cyclic Polyethers and Their Complexes With Metal Salts," Journal of American Chemical Society, volume 89, pp. 7017–7036 [1967] by C. J. Pedersen. Gramicidin, a cyclopeptide, and cyclohexyl-15-crown-5 can also be used.

All these materials are large cyclic structures having center holes and contain electron donators about the periphery of the holes. The center holes are such that certain sized cations can fit inside, so that the electron donators will coordinate with the cations and thus provide the necessary solvation. Under these circumstances, such cations no longer will prefer an aqueous environment and are able to be taken into an organic environment.

Suitable mineral oils are Nujol sold by Plough, Inc. and Vaseline, which is a longer chain mineral oil, sold by Chesebrough-Pond's Inc. Examples of suitable aromatic components are nitrobenzene, phenylethers, chlorobenzene, bromobenzene and alkylated aromatics. The aromatic component may be either solid or liquid.

The compound lipid is provided in a sufficient quantity to render the barrier substantially solid, that is, in the form of a heavy sludge or putty. Compound lipids are esters of fatty acids with alcohols and containing other groups in addition to alcohols and acids. Examples of suitable compound lipids are phosphatides or phospholipids (such as lecithin, lysolecithin, cephalin, inosital lipids and sphingomyelin), phosphatidic acids, glycolipids and sulfolipids. These compounds have generally the following properties. They are solid at room temperature and have a waxy-like texture (as opposed to a regular crystalline material). They are insoluble in water (but may swell in its presence). They function as a surfactant and are capable of emusifying non-homogeneous solutions. This latter property is dependent upon two different chemical moieties, i.e. the material is mostly composed of lipid like (i.e. hydrocarbon with little other functionality) chains or rings with a relatively small portion being ionically charged so that the charged portion(s) will be wetted by water while the bulk of the material will prefer a non-aqueous organic like environment. The charged portion may bear both a positive and negative charge at the same time, i.e. a zwitterion. Commercial phosphatides or phospholipids, as they are also called, are often termed "lecithin" although lecithin is actually the designation of one of the pure phosphatides. They are also sometimes called phosphatidylcholine, lecithol, vitellin, kelecin, phospholutein granulestin. Because of their abundance and economy, such commercial phosphatides (which will be designated as "lecithin" hereinafter) are the preferred compound lipids for use in the present invention. Although only lecithin will be referred to hereinafter in this description, it is to be understood that the other compound lipids mentioned above as well as any other materials having the aforementioned properties may be utilized in practicing the invention.

For an ion sensitive barrier which is selectively sensitive to potassium ions, valinomycin is the preferred macrocyclic compound and a phenylether is the preferred aromatic component, while Nujol is the preferred mineral oil. The macrocyclic compound must be provided in sufficient quantity to render the barrier selectively sensitive to the ion being determined. By way of example, the ratio by weight of the mineral oil, aromatic component, lecithin and valinomycin in a potassium ion sensitive barrier may be approximately 1:1:6:0.04. In other words, the barrier contains about three times as much by weight of lecithin than the other constituents. Satisfactory barriers have been made, however, containing only about twice as much lecithin than the other constituents mentioned above. In addition, successful barriers have been produced wherein the aromatic component was entirely replaced by mineral oil so that the ratio of mineral, lecithin, and valinomycin was about 2:6:0.04. However, such barrier exhibited slightly less stability over long periods than the barrier containing the aromatic component.

For an electrode which is selectively sensitive to ammonium ions in the presence of other cations, the ion sensitive barrier of the present invention contains nonactin as the macrocyclic compound, together with the other three constituents mentioned above. Preferably, for an ammonium ion sensitive barrier, the mineral oil is Nujol and the aromatic component is either 2-phenyloxybiphenyl or bromodiphenylether. The preferred ratio by weight of the Nujol, aromatic component, lecithin and nonactin is about 1:1:6:0.1. While it has been previously known that macrocyclic compounds are somewhat sensitive to ammonium ions, we have discovered that lecithin solidification of a nonactin solution in accordance with the present invention provides an ion sensitive barrier which is highly selective to ammonium ions in the presence of other cations. Most importantly, the solid ammonium ion sensitive barrier of the present invention has substantially greater selectivity to ammonium ions over sodium ions than that of a similar liquid sensing barrier.

We have produced electrodes having ion sensitive barriers of the general type described herein except that certain well known solidification agents, namely, collodion, polystyrene, silica gel, and colloidal silica, were utilized in place of the lecithin. It has been found that these common solidification agents greatly diminish if not totally eliminate the ion selective sensing properties of the barrier. Since lecithin does not exhibit this property, it is considered unique as a solidification agent for ion selective electrode barriers.

Figure 2:
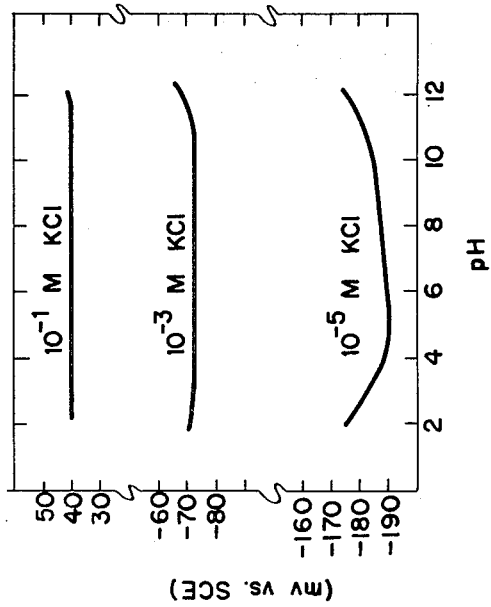
FIG. 2 is an elevational view of the forward end of the electrode illustrated in FIG. 1.
Figure 2:
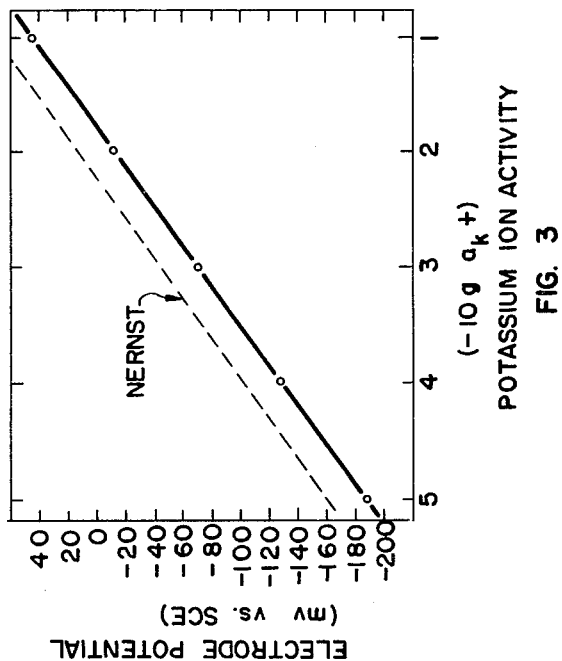

Reference is made to FIGS. 1 and 2 which disclose an electrochemical electrode assembly of a type in which the ion sensitive barrier of the present invention may be employed. The assembly, generally designated 10, includes a hollow tubular electrode body 12 having a reduced diameter forward section 14 adjacent to the forward end 16. A cap 18 is threadedly engaged to the forward section 14. The cap and body are normally formed of a plastic material such as polypropylene, nylon, Teflon [tetrafluoroethylene] or the like. The rear of the body 11 is closed by a cap assembly 20. This assembly may be of the type disclosed in U.S. Pat. No. 3,476,672 to Snyder et al. Such assembly includes a metal cap 22 and a pair of concentrically mounted electrical connectors 24 and 26 which protrude from the rear of the cap. These connectors are separated by a plastic sleeve, not shown. The inner connector 26 is connected to a metal wire 28 that extends into a sensor assembly, generally designated 30, and terminates in an internal half cell 32. The outer connector 24 is connected to a cylindrical metal electrostatic shield 34 which is imbedded within the wall of the body 12.

The sensor assembly 30 is removably mounted within the body 12 by means of the cap 18. Such assembly comprises an elongated tube 36 which is closed at its forward end by the ion sensitive barrier material 38 of the present invention. As seen, the tube is open at its rear end 40 to receive the wire 28. A centrally apertured disc 42 fixedly positioned in the hollow body 12 serves to coaxially position the wire 28 within the body.

The forward portion of the sensor assembly 30 contains an aqueous electrolyte 44 in which the internal half cell 32 is immersed. The tubular portion 36 of the assembly 30 is a capillary tube so that the surface tension of the electrolyte 44 on the wall of the passage within the tube will prevent the escape of electrolyte from the open rear end 40 of the assembly during normal handling of the electrode.

An outwardly extending flange 46 is formed on the tube 36 at a point spaced from its forward end 48. When the cap 18 is threaded onto the forward section 14 of the body 12, a rearwardly facing conical surface 50 on the cap urges the flange 46 into sealing engagement with the forward end of the body 12. An elastomeric sealing gasket 52 is provided between the rear of the cap 18 and a forwardly facing annular shoulder 54 formed on the body 12.

Preferably a membrane 56 having a plurality of openings 58 therein is sealed across the forward end 48 of the tube 36 to provide a protective covering for the ion sensitive barrier material 38. The perforated membrane minimizes the chance of the material 38 from being deformed or moved within the tube 36 by the user of the electrode.

Preferably the tube 36 is formed of glass and the membrane 38 is a collodion film sealed to the forward end of the glass tube. Alternatively, the membrane 38 could be formed of polyethylene, tetrafluoroethylene, or the like, but such materials might have to be sealed to the forward end of the glass tube by means of an elastomeric ring or the like since they do not seal as well by themselves to glass. Thus, the collodion membrane 38 has the advantage of being more easily applied to the end of the tube 36, and in addition has the advantage over the other membrane materials that it is more flexible and does not fracture or tear as easily when punctured to form the openings 58 therein.

To construct the sensor assembly 30, the forward end of the tube 36 is immersed in a solution of collodion, such as Collodion-Flexible sold by Merck. This material comprises cellulose nitrate dissolved in a mixture of ether, ethanol, castor oil, and camphor. Upon withdrawing the tube 36 from such solution, a thin firm membrane will cure and become sealed to the end of the tube, thus providing the protective cover 56. The openings 58 are provided in the membrane 56 adjacent the barrier material 38 to permit free ion passage from the sample solution to the material 38. We have found that three openings each having a diameter of about .010 inch are adequate. Such openings may be made by simply forcing a wire of the aforementioned dimension through the membrane 56. The barrier 38 is provided in the assembly by first dissolving the mixture of aromatic component, mineral oil, macrocyclic compound, and lecithin in a suitable highly volatile solvent, such as chloroform, to form a solution. By the use of a syringe inserted through the rear end 40 of tube 36, this solution is delivered to the forward end of the tube. The solution in the tube is allowed to cure at room temperature, whereupon the chloroform will evaporate thus leaving the solid barrier 38. Thereafter the electrolyte 44 is delivered by a syringe to the interior of the tube 36 through the rear end 40. The entire assembly 30 is then mounted in the hollow body 12 with the internal half cell 32 received through the rear of the tube 36. The assembly 30 is then fixedly retained within the body 12 by means of the cap 18.

It is to be understood that the aforementioned electrode 10 is merely an example of a suitable electrode assembly in which the solid ion sensitive barrier material of the present invention may be employed. Obviously other forms of electrodes could be utilized. For example, the electrode could comprise simply a hollow body closed by a cap having openings extending through the forward end thereof which are filled with the barrier material. In such an assembly, the interior of the electrode body would be filled with the electrolyte in which the internal half cell is immersed.

We have constructed a number of potassium ion measuring electrodes as described herein and shown in FIGS. 1 and 2 employing a barrier material comprising a mixture of Nujol, diphenylether, lecithin, and valinomycin in a weight ratio of approximately 1:1:6:0.04. The lecithin which we used is sold under the trade name "W.H.O. Brand Lecithin" by Western Health Organization, located in Los Angeles, Calif. This lecithin is derived from soy beans. The electrodes were connected together with a standard calomel reference electrodes to a conventional pH meter. The electrodes were preconditioned by soaking for two hours in $10^{-2}$ M KCl. At the end of this period, the resistance of the electrodes was consistently between 100 and 500 megohms.

The electrodes were found to respond to the log of the activity in test solutions ranging from $10^{-5}$ M to 1 M potassium ion in accordance with the Nernst equation:

$$E = \text{Constant} + 59.16 \log a_{K^+} \quad (1)$$

E is the potential in millivolts where $$a_{K^+} = \gamma_{K^+} \times C_{K^+}$$

and $a_{K^+}$ = the potassium ion activity
$\gamma_{K^+}$ the activity coefficient
$C_{K^+}$ = potassium ion concentration.

The activity coefficients were calculated using the Debye-Huckel limiting law.

$$-\log \gamma_{K^+} = \frac{0.511\sqrt{\mu}}{1+1.5\sqrt{\mu}}$$

where $\mu$ = the ionic strength.

Potentials of a typical electrode of the aforementioned type are shown in FIG. 3. The electrode potentials were checked daily during a continuous soaking period of 240 hours in $10^{-2}$ M KCl. No significant drift in the potential output of the electrode was observed during this time as evidenced by comparing the initial potential values to those obtained at the end of the 240 hour period as seen in Table 1 below.

TABLE 1

| Concentration potassium ion | Activity potassium ion | Initial mv. response | Mv. diff. | Mv. response after 240 hours use | Mv. diff. |
|---|---|---|---|---|---|
| $10^{-5}$ | $9.96 \times 10^{-6}$ | $-188$ | | $-187$ | |
| | | | 59 | | 60 |
| $10^{-4}$ | $9.88 \times 10^{-5}$ | $-129$ | | $-127$ | |
| | | | 59 | | 57 |
| $10^{-3}$ | $9.65 \times 10^{-4}$ | $-70$ | | $-70$ | |
| | | | 58 | | 57 |
| $10^{-2}$ | $9.02 \times 10^{-3}$ | $-12$ | | $-13$ | |
| | | | 54 | | 54 |
| $10^{-1}$ | $7.7 \times 10^{-2}$ | $+42$ | | $+41$ | |

When the electrodes were tested in test solutions having a potassium ion concentration ranging from $10^{-4}$ to $10^{-1}$ M KCl with a constant background of 0.2 M NaCl, the potentials of the electrodes dropped only about 2 or 3 millivolts from the figures appearing in Table 1. Our tests further showed that the response time of the electrodes in test solutions between $10^{-5}$ and $10^{-1}$ M KCl was less than one second. The affect of pH on the potassium electrodes was observed in solutions of $10^{-5}$, $10^{-3}$, and $10^{-1}$ M KCl. The pH was adjusted by additions of barium hydroxide, or 0.1 M hydrochloric acid to the starting solutions. The resulting potentials of a typical electrode tested in such solutions are plotted against pH in FIG. 4. As can be seen, the potassium ion measuring electrodes were not seriously affected by differences in the pH activity of the test solutions.

Ion selective electrodes of the general type to which the present invention pertains characteristically respond to several different ions. The value of an electrode as an analytical tool is dependent upon its ability to sense the primary ion [in the present example, potassium] over interferent ions which may be present in the test solution. The affinity of the electrode for interferent ions may be expressed in terms of a selectivity coefficient, K, as described below in the Nicolsky equation:

$$E = E'_0 + \frac{RT}{F} \ln aK^+ + K_{K^+/i} a_i^{1/z_i} \quad (2)$$

where

E = observed potential in millivolts,
R is the universal gas constant,
T is the absolute temperature,
F is the Faraday constant,
$E_0'$ is a constant dependent on the internal and the reference electrodes employed,
$a_{K^+}$ is the potassium activity,
$a_i$ is the activity of the interferent ion, and
$z_i$ is the charge of the interferent ion.

Tables 2 and 3 below list K values of the electrode for a variety of cations. These values were obtained by two different methods. The values in Table 2 were determined by observing the potential of the potassium ion measuring electrode in solutions in which the interferent ion level was held constant and the potassium concentration was varied by a decade. The reslting data was used in the following expression.

$$K = \frac{2a_{K^+} - \theta_1 a_{K^+}}{\theta a_i^{1/z_i} - a_i^{1/z_i}} \quad (3)$$

where $\theta$ is the expression $e^{F \Delta E_2-1/RT}$

TABLE 2
Selectivity coefficients from Equation 3

| Ion: | Selectivity coefficient (K) |
|---|---|
| $NH_4^+$ | $1.9 \times 10^{-2}$ |
| $Ca^{++}$ | $2 \times 10^{-5}$ |
| $Cu^{++}$ | $3 \times 10^{-5}$ |
| $H^+$ | $2 \times 10^{-4}$ |
| $Mg^{++}$ | $2 \times 10^{-5}$ |
| $Na^+$ | $5 \times 10^{-5}$ |

The selectivity coefficients listed in Table 3 were obtained from the following equation:

$$K = \frac{a_{K^+}}{a_i} e^{-F \Delta E/RT} \quad (4)$$

This expression compares the absolute potentials of the electrode in two solutions, one containing only potassium salts and the other containing only salts of monovalent interferent ions.

This expression compares the absolute potentials of the electrode in two solutions, one containing only potassium salts and the other containing only salts of monovalent interferent ions.

TABLE 3

Selectivity coefficients from Equation 4

| Ion: | Selectivity coefficient (K) |
| --- | --- |
| $Cs^+$ | 0.5 |
| $Li^+$ | $3 \times 10^{-4}$ |
| $Ag^+$ | $1.7 \times 10^{-3}$ |
| $Rb^+$ | 2.2 |

It will be observed in Table 2 that the divalent ions exhibit extremely low selectivity coefficients. The monovalent ions (see Tables 2 and 3) cover a range from $5 \times 10^{-5}$ to 2.2. The greatest interference comes from rubidium and cesium. These ions, however, are not encountered in most test solutions. The interferences encountered with the ions of silver and ammonium are not serious. The selectivity of potassium over sodium and lithium is great enough to allow measurements of potassium ion to be made in the presence of an extremely large concentration of these interferents.

We have also constructed a number of ammonium ion measuring electrodes in accordance with the present invention utilizing the electrode assembly 10 disclosed in FIGS. 1 and 2. In one group of such electrodes, the ion sensitive barrier comprised a mixture of Nujol, 2-phenyloxybiphenyl, lecithin, and nonactin in a weight ratio of approximately 1:1:6:0.1. The electrodes were preconditioned by soaking them for 72 hours in $10^{-3}$ M ammonium chloride solution. The resistance of the electrodes at the end of this period was approximately 400 megohms. Table 4 below shows the millivolt difference of the potential of three electrodes of the aforementioned type tested in a variety of test solutions, including single ion solutions of ammonium, and mixed ion solutions of ammonium and sodium, and ammonium and potassium, respectively.

TABLE 4

| Test solution | Millivolt difference | | |
| --- | --- | --- | --- |
| | Electrode I | Electrode II | Electrode III |
| $10^{-5}$ M $NH_4Cl$ | 59 | 58 | 57 |
| $10^{-4}$ M $NH_4Cl$ | 60 | 59 | 57 |
| $10^{-3}$ M $NH_4Cl$ | 58 | 58 | 59 |
| $10^{-2}$ M $NH_4Cl$ | 53 | 55 | 54 |
| $10^{-1}$ M $NH_4Cl$ | | | |
| $10^{-4}$ M $NH_4Cl$—$10^{-1}$ M NaCl | 34 | 38 | 38 |
| $10^{-3}$ M $NH_4Cl$—$10^{-1}$ M NaCl | | | |
| $10^{-2}$ M $NH_4Cl$—$10^{-1}$ M KCl | 36 | 36 | 37 |
| $10^{-1}$ M $NH_4Cl$—$10^{-1}$ M KCl | | | |

Based upon Equation 3, the selectivity coefficients of the aforementioned ammonium ion electrodes for sodium ions is approximately $2.5 \times 10^{-3}$ and for potassium ions, approximately $1.7 \times 10^{-1}$.

Additional K values based upon Equation 3 have been determined on an ammonium ion electrode identical to that described hereinabove except that the solvent 2-phenoxybiphenyl was replaced by bromodiphenylether. The K values for such electrode appear in Table 5 below.

TABLE 5

| Ion: | Selectivity coefficient (K) |
| --- | --- |
| $Na^+$ | $1.7 \times 10^{-3}$ |
| $K^+$ | $1.5 \times 10^{-1}$ |
| $Ba^{++}$ | $1 \times 10^{-4}$ |
| $Mg^{++}$ | $7 \times 10^{-5}$ |
| $Ca^{++}$ | $7 \times 10^{-5}$ |
| $Cu^{++}$ | $1 \times 10^{-4}$ |
| $Zn^{++}$ | $7 \times 10^{-5}$ |
| $Ni^{++}$ | $7 \times 10^{-5}$ |
| $Pb^{++}$ | $1 \times 10^{-4}$ |
| $Hg^{++}$ | $3 \times 10^{-1}$ |
| $Ag^+$ | $5 \times 10^{-2}$ |
| $Rb^+$ | $1.2 \times 10^{-1}$ |

Our tests of the latter-mentioned ammonium ion selective electrode showed a response time of less than one second for a decade change in ammonium ion concentration of the test solutions. In addition, the electrode potential was virtually constant when the pH of the test solutions was varied from 2 to 8.5.

By way of comparison, we constructed an electrode of the type containing an organic sensing solution supported by a filter barrier similar to a commercial electrode presently available on the market. The sensing solution contained a mixture in equal parts by weight of Nujol and diphenylether, and 1% by weight nonactin. No lecithin was contained in the ion sensitive barrier. The electrode was tested in two test solutions, one containing $10^{-2}$ M $NH_4Cl$ and $10^{-1}$ KCl and the other solution contained $10^{-1}$ M $NH_4Cl$ and $10^{-1}$ M KCl. The difference in the millivolt output of the electrode between these two test solutions was between 1 and 2. By comparing such potentials with the potentials appearing at the bottom of Table 4 above for the same test solutions, it is seen that the electrode of the present invention containing lecithin as a solidification agent produces much greater selectivity to the ion being measured than a similar electrode without lecithin.

From the foregoing, it can be seen that by the present invention there is provided an ion measuring electrode utilizing an essentially solid ion sensitive barrier, which is more convenient to utilize than liquid barriers, is selectively sensitive to the ions being measured, has rapid response time and satisfactory electrical resistance, thus making the electrode useful for rapid, accurate and facile ion concentration measurements.

While several embodiments of the invention have been disclosed herein for purposes of illustration, it will be understood that various changes, alterations and modifications may be made thereto without departing from the spirit and scope of the invention as defined by the appended claims.

What is claimed is:

1. An electrode for measuring the ion activity of a solution having an ion sensitive barrier, wherein the improvement comprises said barrier containing a macrocyclic compound, mineral oil, and a sufficient amount of a compound lipid to render the barrier substantially solid, said lipid being selected from the group consisting of phosphatides, phosphatidic acids, glycolipids, and sulfolipids and said macrocyclic compound being selected from the group consisting of the monactin series, valinomycin, enniatin B, dicyclo - hexyl - 18 - crown-6, cyclohexyl-15-crown-5, and gramicidin.

2. An electrode as set forth in claim 1 wherein said macrocyclic compound is from the monactin series.

3. An electrode as set forth in claim 1 wherein said macrocyclic compound is valinomycin.

4. An electrode as set forth in claim 1 wherein said electrode includes a nonconductive tube, said barrier closes one end of said tube, and a perforated membrane covers said one end of said tube.

5. An electrode as set forth in claim 4 wherein said membrane comprises a collodion coating covering said one end of said tube.

6. An electrode as set forth in claim 1 wherein said barrier contains an aromatic component.

7. An electrode as set forth in claim 6 wherein said aromatic component is a phenylether.

8. An electrode as set forth in claim 7 wherein said phenylether is bromodiphenylether.

9. An electrode as set forth in claim 6 wherein said barrier contains about equal amounts by weight of said mineral oil and aromatic component.

10. An electrode as set forth in claim 6 wherein said lipid is a phosphatide and the ratio by weight of said mineral oil and aromatic component to said phosphatide is about 1 to 3.

11. An electrode as set forth in claim 1 wherein said lipid is a phosphatide and the ratio by weight of said mineral oil to said phosphatide is about 1 to 3.

12. An electrode as set forth in claim 1 wherein said barrier contains an aromatic component, said macrocyclic compound is valinomycin and said lipid is a phosphatide.

13. An electrode as set forth in claim 12 wherein the ratio by weight of said mineral oil, aromatic component, phosphatide and valinomycin is approximately 1:1:6:0.04.

14. An electrode as set forth in claim 1 wherein said barrier contains an aromatic component, said macrocyclic compound is nonactin, and said lipid is a phosphatide.

15. An electrode as set forth in claim 14 wherein the ratio by weight of said mineral oil, aromatic component, phosphatide and nonactin is approximately 1:1:6:0.1.

16. An electrode as set forth in claim 1 wherein said barrier contains an aromatic component and about twice as much by weight or more of said lipid than the total amount of said mineral oil and component.

17. An electrode as set forth in claim 1 wherein said lipid is lecithin.

18. An electrode as set forth in claim 17 wherein said barrier contains an aromatic component.

19. An electrode as set forth in claim 1 wherein there is present in said barrier at least twice as much by weight of said lipid as the other constituents in the barrier.

References Cited

UNITED STATES PATENTS

| | | | |
|---|---|---|---|
| 3,562,129 | 2/1971 | Simon | 204—195 |
| 3,607,700 | 9/1971 | Tosteson | 204—1 T |

OTHER REFERENCES

"Microchemical Journal," vol. 12, pp. 125–132, 1967.
"Chimia," vol. 23, pp. 72–73, February 1969.
"Analytical Letters," vol. 2, pp. 665–674, 1969.
"Science," vol. 167, pp. 987–988, 1970.

TA-HSUNG TUNG, Primary Examiner

U.S. Cl. X.R.

204—1 T, 195 L